(12) United States Patent
Deng et al.

(10) Patent No.: US 9,330,341 B2
(45) Date of Patent: May 3, 2016

(54) IMAGE INDEX GENERATION BASED ON SIMILARITIES OF IMAGE FEATURES

(71) Applicant: Alibaba Group Holding Limited, George Town (KY)

(72) Inventors: Yu Deng, Beijing (CN); Ke Chen, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 341 days.

(21) Appl. No.: 13/741,967

(22) Filed: Jan. 15, 2013

(65) Prior Publication Data

US 2013/0195361 A1    Aug. 1, 2013

(30) Foreign Application Priority Data

Jan. 17, 2012   (CN) .......................... 2012 1 0015290

(51) Int. Cl.
  *G06K 9/62*   (2006.01)
  *G06K 9/46*   (2006.01)
  *G06F 17/30*   (2006.01)

(52) U.S. Cl.
  CPC .......... *G06K 9/6232* (2013.01); *G06F 17/3025* (2013.01); *G06F 17/30256* (2013.01); *G06F 17/30259* (2013.01); *G06F 17/30262* (2013.01); *G06F 17/30268* (2013.01); *G06K 9/4671* (2013.01); *G06K 9/6223* (2013.01)

(58) Field of Classification Search
  None
  See application file for complete search history.

(56) References Cited

U.S. PATENT DOCUMENTS

| 5,751,286 A | 5/1998 | Barber et al. |
| 5,911,139 A | 6/1999 | Jain et al. |

(Continued)

FOREIGN PATENT DOCUMENTS

| CN | 1851709 | 10/2006 |
| CN | 101211341 | 7/2008 |

(Continued)

OTHER PUBLICATIONS

Csurka et al., "Visual Categorization with Bags of Keypoints", In ECCV International Workshop on Statistical learning in Computer Vision, Prague, 2004 (Oct. 2004), 1 cover page and 16 pages of the article itself.*

(Continued)

*Primary Examiner* — Brian P Werner
(74) *Attorney, Agent, or Firm* — Van Pelt, Yi & James LLP

(57) ABSTRACT

Embodiments of the present application relate to an image index generation method, system, a device, and a computer program product. An image index generation method is provided. The method includes selecting an image included in an image library for which an image index is to be generated, determining at least one target region included in the image, extracting visual features from the determined at least one target region, determining a similarity value of the selected image and image included in the image library based on the extracted visual features, determining image categories to which the images belong to based on the determined similarity values among the images, and assigning category identifiers to the images in accordance with an identifier assignment method, the identifier assignment method assigns the same category identifiers to images belonging to the same image category, and different category identifiers to images belonging to different image categories.

22 Claims, 6 Drawing Sheets

(56) References Cited

U.S. PATENT DOCUMENTS

| | | | |
|---|---|---|---|
| 5,930,783 | A | 7/1999 | Li et al. |
| 6,026,411 | A | 2/2000 | Delp |
| 6,415,282 | B1 | 7/2002 | Mukherjea et al. |
| 6,463,426 | B1 | 10/2002 | Lipson et al. |
| 6,754,675 | B2* | 6/2004 | Abdel-Mottaleb et al. |
| 6,865,302 | B2 | 3/2005 | Chang |
| 6,882,746 | B1 | 4/2005 | Naveen et al. |
| 7,039,229 | B2 | 5/2006 | Lin et al. |
| 7,054,481 | B2 | 5/2006 | Lloyd-Jones |
| 7,155,033 | B1 | 12/2006 | Naveen et al. |
| 7,212,670 | B1* | 5/2007 | Rousselle ............ 382/173 |
| 7,554,688 | B2 | 6/2009 | Choi |
| 7,813,561 | B2 | 10/2010 | Jia et al. |
| 8,577,153 | B2 | 11/2013 | Duan et al. |
| 2006/0170769 | A1* | 8/2006 | Zhou ............ G06K 9/00362 348/143 |
| 2006/0206482 | A1 | 9/2006 | Soussaline et al. |
| 2006/0230100 | A1 | 10/2006 | Shin et al. |
| 2007/0133947 | A1 | 6/2007 | Armitage et al. |
| 2007/0274609 | A1 | 11/2007 | Hirai et al. |
| 2007/0288453 | A1 | 12/2007 | Podichuk |
| 2008/0052312 | A1 | 2/2008 | Tang et al. |
| 2008/0069480 | A1 | 3/2008 | Arabi et al. |
| 2008/0082426 | A1 | 4/2008 | Gokturk et al. |
| 2008/0292196 | A1 | 11/2008 | Jain et al. |
| 2009/0279794 | A1 | 11/2009 | Brucher et al. |
| 2010/0232719 | A1 | 9/2010 | Vincent et al. |
| 2010/0293164 | A1 | 11/2010 | Weese et al. |
| 2012/0148120 | A1 | 6/2012 | Yagi et al. |
| 2014/0250120 | A1* | 9/2014 | Mei et al. ............ 707/736 |

FOREIGN PATENT DOCUMENTS

| | | |
|---|---|---|
| CN | 101211355 | 7/2008 |
| CN | 101751439 | 6/2010 |
| JP | 2011076575 | 4/2011 |

OTHER PUBLICATIONS

Pierre-Alain Moellic et al., "Image clustering based on a shared nearest neighbors approach for tagged collections", Proceedings of the 2008 International Conference on Content-based Image and Video Retrieval, CIVR '08, Jul. 7, 2008, p. 269.

Ben-Haim et al., "Improving Web-based Image Search via Content Based Clustering", 2006 Conference on Computer Vision and Pattern Recognition Workshop, New York, Jun. 17-22, 2006, IEEE, Jun. 17, 2006, p. 106.

Yukio Uematsu et al., "Clustering presentation of web image retrieval results using textual information and image features", Proceedings of European Internet and Multimedia Systems and Applications Conference, Feb. 13-15, 2006, Innsbruck, Austria, Feb. 13, 2006, pp. 217-222.

Jingyu Cui et al., "Real time google and live image search re-ranking", Proceeding of the 16th ACM International Conference on Multimedia, MM '08, Jan. 1, 2008, p. 729.

Luo et al., "A World Wide Web Based Image Search Engine Using Text and Image Content Features", Proceedings of SPIE-IS&T Electronic Imaging, SPIE vol. 5018, Jan. 2003.

Chen et al., "CLUE: Cluster-based Retrieval of Images by Unsupervised Learning", Paper, Jun. 23, 2004.

Wang et al., "IGroup: Presenting Web Image Search Results in Semantic Clusters", Paper, Apr. 2007.

* cited by examiner

IMAGE INDEX GENERATION BASED ON SIMILARITIES OF IMAGE FEATURES

This application claims priority to People's Republic of China Patent Application No. 201210015290.8 entitled AN IMAGE INDEX GENERATION METHOD AND EQUIPMENT, filed Jan. 17, 2012 which is incorporated herein by reference for all purposes.

FIELD OF THE INVENTION

This application relates to an image index generation method and device.

BACKGROUND OF THE INVENTION

In the information searching field, traditional keyword-based information retrieval methods have limitations. The same word can have different meanings in different contexts. For example, the word "apple" has very different meanings in different fields. The word "apple" expresses a type of fruit and also expresses a brand of electronic products. If a user intends to search a type of fruit and enters "apple" into a search engine as the keyword, the returned search results will generally include information concerning the two vastly different subjects of fruit and electronic products. In this case, information relating to the brand of electronic products does not match the user's search intentions. Accordingly, keyword-based information retrieval methods may return divergent results between the search results and the user's search intentions.

Technologies exist to address the divergent results of corresponding images for most of the data information that is online. On some search systems, for example, when a user performs an information search, the user can enter an image into the search engine. Thus, based on the image entered into the search engine by the user, by retrieving all information related to the image (hereinafter referred to as the image information), images that have image information matching the entered image information can be retrieved from the image library. By matching the entered image information to image information in the image library, the disadvantages of the keyword-based information retrieval methods described above can be overcome.

Similar to the generation of an information index in the keyword-based information retrieval methods, the image-based information retrieval method described above also generates an index for the large amount of images in the image library, to provide data support for the subsequent retrieval method. When an image index is generated for the images in an image library, conventional image-based information retrieval technologies use file names relating to the images (or other text information relating to the images). Preconditions for the method to be used include users manually adding descriptive text information to the images. One of the limitations of an image index generation method including the manual addition of descriptive text information is the fact that the number of images in an image library is usually very large. Thus, the conventional image index generation method including the manual addition of descriptive text information results in a large consumption of processing resources. Furthermore, because a user's subjective feelings about the images are incorporated into the descriptive text information, the image index generation methods described above may have reduced accuracy due to the influence from the user's subjective feelings.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to improve the relatively low accuracy of an image index generated using a conventional method, the following disclosure discloses an image generation method, device, and system.

Figure 1:
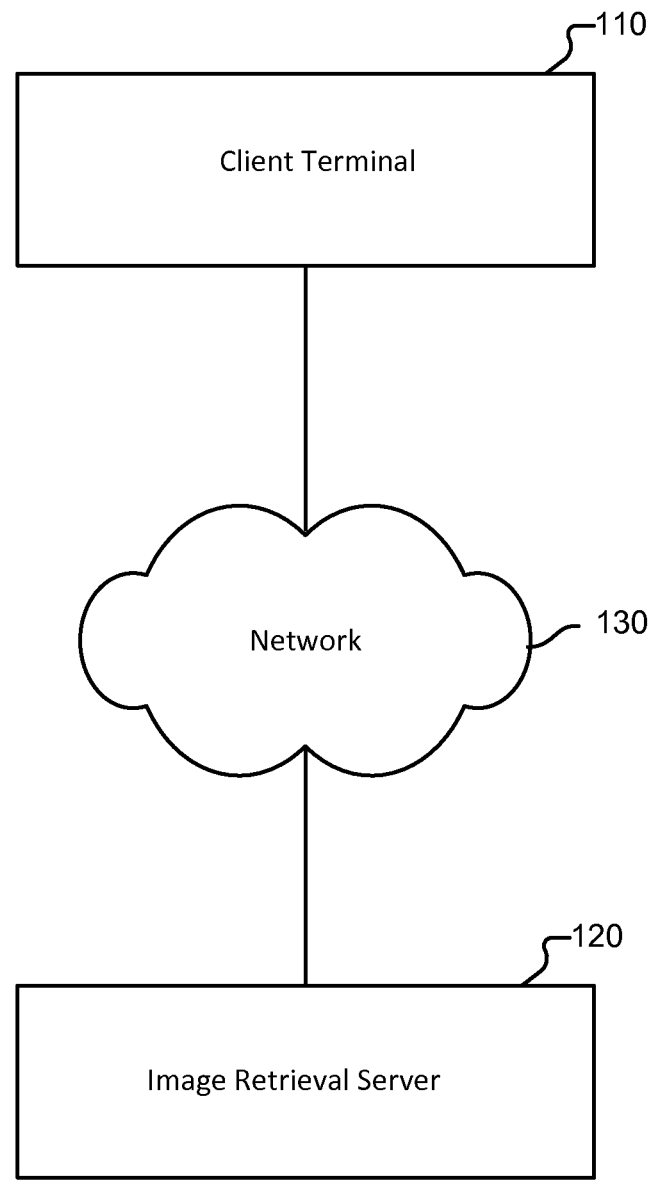
FIG. 1 is a diagram illustrating an embodiment of an image index generation system.

The image index generation method, device, and system are described below, in light of the drawings. FIG. 1 is a diagram of an embodiment of an image index generation system. The system 100 includes a client terminal of a user 110, an image retrieval server 120 connected via a network 130.

The user can issue a search request via the client terminal 110 across the network 130 to the image retrieval server 120.

The image retrieval server 120 is configured to select an image included in an image library for which an image index is to be generated, determine at least one target region included in the image, extract visual features from the determined at least one target region, determine similarity values of images included in the image library based on the extracted visual features, determine image categories to which the images included in the image library belong to based on the determined similarity values among the images, and assign category identifiers to the images included in the image library in accordance with an identifier assignment method. The identifier assignment method assigns the same category identifier to images belonging to the same image category, and different category identifiers to images belonging to different image categories.

The image retrieval server 120 can send the results of the search request to the client terminal 110 for presentation to the user.

Figure 2:
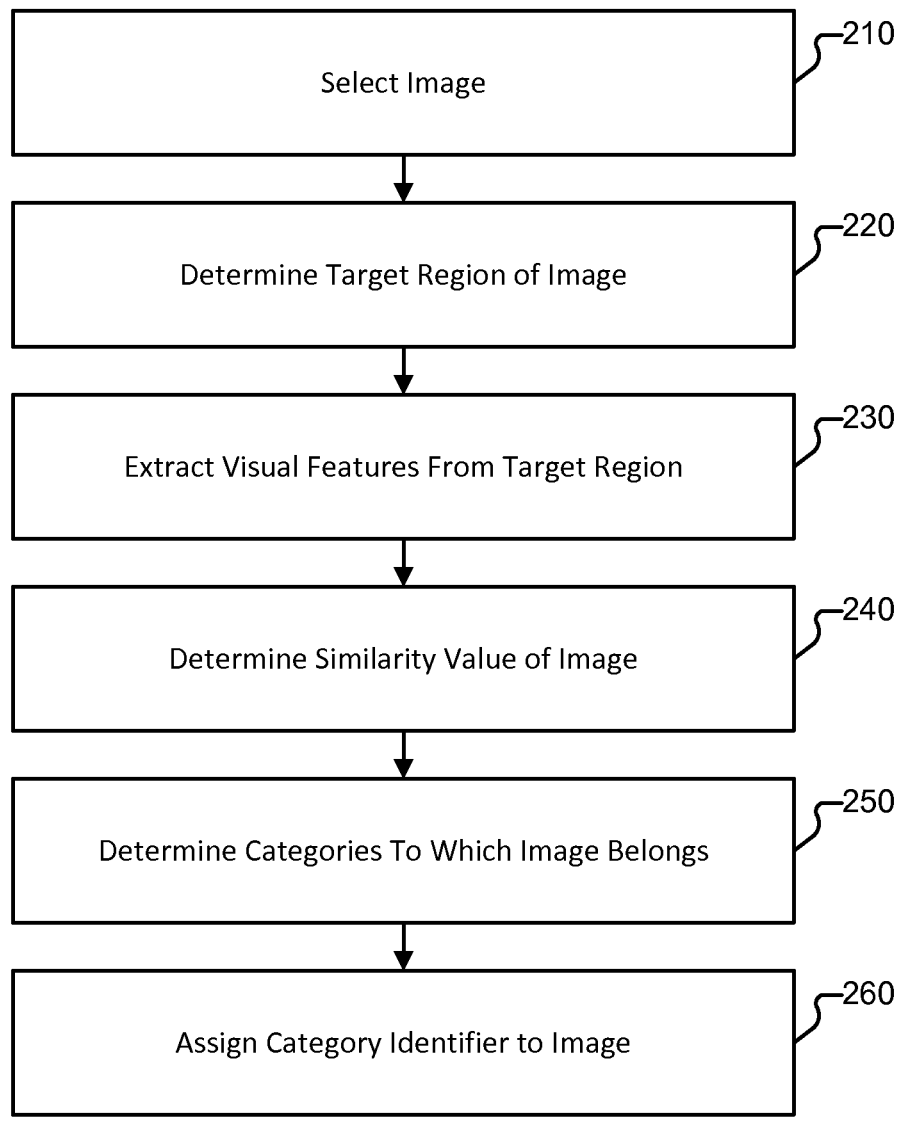
FIG. 2 is a flowchart illustrating an embodiment of an image index generation process.

FIG. 2 is a flowchart of an embodiment of an image index generation method. The method 200 can be implemented by the image index generation system 100. The image index generation method 200 includes the following steps:

In step 210, the image retrieval server 120 selects an image from an image library for which an index is to be generated. In various embodiments, the image library can be located locally (e.g., on a storage component that is a part of the image retrieval server), or remotely (e.g., on a separate database server or other storage device that is physically separate from the image retrieval server and that is accessible over a network.)

In step 220, the image retrieval server 120 determines at least one target region included in the image.

In step 230, the image retrieval server 120 extracts visual features from the at least one target region of the image.

Generally, it is assumed that an image has a foreground and a background, and the foreground of the image reflects the primary content of an image. It is also assumed that users attach importance mostly to the foreground of an image, and attach little importance to the background of an image. Therefore, in the present application, the foreground of an image can serve as the at least one target region of the image. In other words, foregrounds of images from the image library are determined to be the target regions of the images, and visual features are only extracted from the foregrounds of the images. The target regions are also referred to as foregrounds. For an image, there may be one or more target regions. The number of target regions depends on how the image is segmented. For example, an image of a coat has one target region because the image only has one segment (e.g., the coat itself), while an image of a woman wearing the coat has two target regions because the image is segmented into two regions (e.g., the coat and the woman's face).

In step 240, the image retrieval server 120 determines a similarity value with respect to the selected image and another image included in the image library based on the visual features extracted from the at least one target region of the image. Since similarity values can indicate the degree of similarity of the two images, in some embodiments, the similarity value can be normalized to a value between 0 and 1. For example, the similarity value between the two images can be 0.925.

In some embodiments, the image retrieval server 120 can select a particular image in the image library, determine at least one target region in the selected image, and extract visual features from the at least one target region included in the image. The extracted visual features can include the following features: color, shape, texture, scale-invariant feature transform (SIFT), and the like. SIFT is a well-known technique. Basically, SIFT features correspond to an extreme point in a spatial scale, and the extreme point's location, scale, and rotation invariant. Upon extraction of the visual features of the image, the image retrieval server 120 can determine a similarity value with respect to the selected image and another image in the image library. In other words, the similarity value can be determined based on the visual features of the selected image and the visual features of the selected image and the other image in the image library. The similarity value can be obtained by calculating the degree of similarity of visual features between two images.

In step 250, the image retrieval server 120 determines at least one image category to which the image of the image library belongs based on the similarity values among the images of the image library.

In some embodiments, a number of images having relatively small differences in similarity values can be determined to be in the same image category.

In step 260, the image retrieval server 120 separately assigns category identifiers to the images of the image library based on an identifier assignment method. The identifier assignment method assigns the same category identifiers to images belonging to the same image category, and assigns mutually different category identifiers to images belonging to different image categories.

In other words, for each image in the same image category, the category identifier is the same for each image. For images in different image categories, the category identifiers for the images are different. The category identifiers assigned to the images then serve as the generated image index. In subsequent search processes, searches in the image library can be performed based on the image index of the images. For example, the searches in the image library can be performed with respect to the category identifiers of the images.

In the method 200, the image retrieval server 120 separately extracts visual features from target regions in the images included in the image library, determines the similarity values of the images in the image library based on the extracted visual features, determines the image categories to which the images belong to, and, lastly, assigns the same category identifiers to images belonging to the same image category based on the similarity values, assigns different category identifiers to images belonging to different image categories based on the similarity values, and uses the assigned category identifiers of the images as the generated image index for the image library.

In comparison to conventional methods, the method 200 can be implemented on the image index generation system 100, without requiring manual addition of descriptive text to the image index, which increases the efficiency of the generation of the image index. Moreover, the influence of subjective feelings of operators incorporated when an image index is generated manually is reduced, and the accuracy of the generated image index is increased because the generated image index is generated based on the extracted visual features from the images, the determined similarity values of the images, and the subsequent determined image categories to which the images belong to.

Below is a description of an example of the image index generation method and an image search method.

Figure 3A:
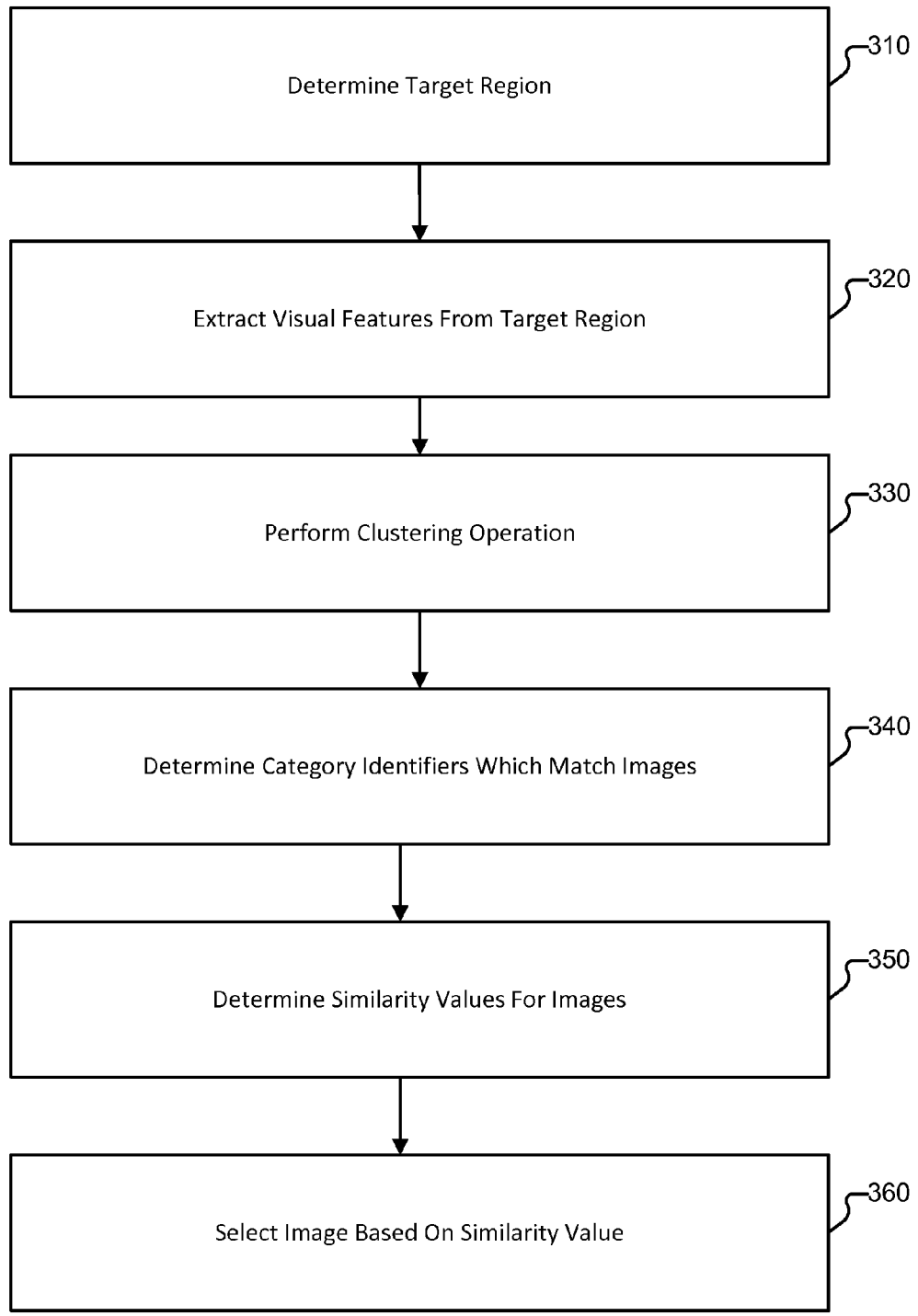
FIG. 3A is a flowchart illustrating an embodiment of a multi-feature fusion image search method.

The image index generation method and the image search method are two mutually independent methods, but these two methods can be reflected in one flow. In order to describe the methods, the one flow including the two methods will be referred to as the "multi-feature fusion image search method." FIG. 3A is a flowchart illustrating an embodiment of a multi-feature fusion image search method. Although the image index generation method can be performed entirely while the system is offline, the image searching method takes place while the system is online. Therefore, in order for the names to reflect the different characteristics of the image index generation method and the image search method with respect to implementation time, the image index generation method will be referred to as the "offline processing process" and the image search method will be referred to as the "online search process." Of course, the present application does not limit image index generation to offline processing technologies. One skilled in the art understands that the image index generation can also be implemented using online processing technologies.

FIG. 3A describes steps 310-330 belonging to the offline processing process, and steps 340-360 belonging to the online search process.

In step 310, the image retrieval server 120 selects an image included in an image library for which an image index is to be generated, and extracts at least one target region from the image.

In the present application, image segmentation and machine learning are combined to extract the at least one target region of the image. For example, step 310 can be implemented using steps 312-316, as illustrated in FIG. 3C. FIG. 3C is a flowchart illustrating an embodiment of a method of determining at least one target region in images.

In step 312, the image retrieval server 120 performs an image smoothing operation on the image. In some embodiments, the image smoothing operation is implemented based on a mean-shift technique.

The mean-shift technique is a mature technology, which can be applied in the fields of clustering, image smoothing, image segmentation and tracking The mean-shift technique is well understood in the art. Accordingly, a detailed description of the mean-shift algorithm will be omitted for conciseness.

The mean-shift technique is essentially a self-adaptive gradient ascent peak search method. The self-adaptive gradient ascent peak search method is as follows: if the dataset $\{x_i, i=1, 2, \ldots, n\}$ obeys a probability density function $f(x)$, then if an initial point x is given, and the mean-shift technique is executed targeting the initial point x, the mean-shift technique will cause the point to move step by step until converging to a peak point. In light of an image, if the dataset $\{x_i, i=1, 2, \ldots, n\}$ corresponds with various pixel points in the image, then if each of the pixel points in the dataset is used as the initial point, and the mean-shift technique is executed on each pixel point separately, ultimately each pixel point in the dataset can converge to a corresponding peak point. By converging each pixel point to the corresponding peak point, the image is smoothed.

Based on an implementation of the mean-shift technique, an image can be expressed as a p-dimensional vector on two-dimensional grid points, where each grid point corresponds to one pixel. For example, p equaling 1 indicated that the image is a grayscale image, p equaling 3 indicates that the image is a color image, and p being greater than 3 indicates that the image is a multispectral image. Grid point coordinates are generally used to indicate spatial information of the image. By jointly utilizing the spatial information and color (or grayscale, etc.) information of the image, a p+2 dimensional vector $x=(x^s, x^r)$ can be formed, where $x^s$ indicates the grid point coordinates, and $x^r$ indicates features of the p-dimensional vector on the grid.

If the distribution of x is estimated using a kernel function $K_{h_s,h_r}$, then $K_{h_s,h_r}$ can be represented by formula [1] below:

$$K_{h_s,h_r} = \frac{C}{h_s^2 h_r^p} k\left(\left\|\frac{x^s}{h_s}\right\|\right) k\left(\left\|\frac{x^r}{h_r}\right\|^2\right) \quad [1]$$

In formula [1], $h_s$ and $h_r$ control the resolution of smoothing (in this context, resolution refers to image clarity), C is a normalizing constant, and the following conditions are satisfied:

k is non-negative.
k is non-incremental. For example, if a<b, then k(a)≥k(b).
k is piecewise continuous, and $\int_0^\infty k(r)dr<\infty$.

Assuming that $x_i$ and $z_i$ (i=1, 2, ..., n), respectively, indicate the original and the smoothed image. The mean-shift technique to perform image smoothing include the following steps:

The following operations are performed on each pixel point:
1. Initialize j=1, and let $y_{i,1}=x_i$;
2. Apply the mean-shift technique to compute $y_{i,j+1}$, until $y_{i,j+1}$ converges to a peak point, and record the converged value as $y_{i,c}$; and
3. Assign the value of $z_i=(x_i^s, y_{i,c}^r)$, where $z_i$ is the smoothed image.

One of the purposes of smoothing the image is to eliminate noisy pixels. Thus, higher quality images can be provided for other subsequent image processing operations. One skilled in the art understands that the image smoothing technique can be omitted without substantially affecting the other subsequent image processing operations. Additionally, other image smoothing techniques can also be used to implement image smoothing, such as the Crimmins Speckle Removal technique, a triangular wave oscillator, an order statistics filter, etc.

In step 314, the image retrieval server 120 separately uses each pixel point of the smoothed image as seeds to perform region growing. Region growing is performed to obtain a preliminarily segmented image. The smoothed image is composed of different regions obtained through segmentation.

In order to distinguish the different regions of the image, grayscale values of the pixels in a region can be used as an image identifier of the region.

"Region growing" refers to developing groups of pixel points or regions into larger regions. Region growing begins from seeds (i.e., individual pixels). Specifically, region growing refers to the merging of seeds and adjacent pixel points having similar attributes into one region. The attributes may include grayscale, texture, color, etc. Region growing is an iterative process in which region growing targets each seed until each pixel point of the image is merged into a certain region. Thus, the image can be segmented into different regions. The boundaries of the different regions are usually defined by closed polygons.

Other image segmentation techniques can also be used to segment the image. The other image segmentation techniques may include threshold segmentation techniques, region splitting and merging techniques, margin-based segmentation techniques, etc.

In step 316, the image retrieval server 120 uses a support vector machine (SVM) method to separately perform a background confidence determination on each of the segmented regions.

The background confidence determination performed on each segmented region of the image determines whether the each segmented region is a background or a foreground region. In other words, the background confidence determination determines whether the each segmented region is a background or a foreground of the image. The foreground region of the image is the target region.

As another aspect, a predetermined number of sample images can be selected from the image library to constitute a first sample image library. Based on the background and the foreground regions included in each sample image in the first sample image library, which can be manually determined in advance, a background region determination model can be trained. Since the background regions and the foreground regions included in the images in the first sample image library are already determined, the images in the first sample image library can be used as training samples to fit a background region determination model using the SVM method. Thus, in the event that the fitted background region determination model is used to determine the background region and the foreground region of the images in the sample image library, a majority of the results obtained will be correct relative to the known results. In other words, given a set of training samples with predetermined background and foreground regions, a majority of the results obtained from the model (i.e., whether a pixel is in the foreground or background) need to be the same as the predetermined results for the model to be deemed acceptable. For example, a threshold of over 90% of the results need to be correct in order for the fitted background region determination model to be considered acceptable to be used on individual images in other unknown target regions. Thus, based on the background region determination model, after the different segmented regions of the image are matched, the background region and the foreground region among the segmented regions included in the image can be determined.

At this point, the target regions in the image have been determined, and the target regions of the images included in the image library can be determined using steps 312-316 described above.

In step 320, the image retrieval server 120 extracts visual features from the determined at least one target region.

Generally, the extracted visual features include a global visual feature and a local visual feature. In various embodiments, the image retrieval server 120 can extract only global visual features, only the local visual features, or both global visual features and local visual features. The global visual features may include, but are not limited to, color features, shape features, etc. The local visual features may include, but are not limited to, texture features, SIFT features, etc.

Feature extraction techniques used to extract the different visual features include the following:

1. Feature Extraction Technique for Extracting Color Features.

In the present application, a color histogram statistically obtained within the at least one target region of the image can serve as color features of the image. In order to compute the color histogram, a quantification processing can first be carried out on the color features of the at least one target region. For example, sparse coding can be used as the quantification processing.

For example, the color histogram can include 24 bins, where each bin respectively and non-repetitively corresponds to one of 24 common colors made up from the three primary colors of red, green, and blue (RGB). In the example, the 24 common colors can, without limitation, be statistically obtained based on a large number of photographs. For each pixel point in an image, the color made up from the three primary RGB colors corresponding to the pixel point can correspond to one bin. For any image, the bins of the color histogram reflect the number of pixel points that possess the corresponding colors in the image. Therefore, for each pixel point in the at least one target region of the image, by separately executing a statistical counting operation of the numbers of pixel points to which the aforesaid 24 colors respectively correspond to, the color histogram corresponding to the target region in the image may be obtained. In other words, by counting all the color values of the pixels, a 24-dimensional color histogram can be obtained. The color histogram then represents the color features of the at least one target region in the image.

Furthermore, because the color histogram relates to the statistical numbers of the various pixel points in the at least one target region of the image that correspond to the 24 colors, the number of pixel points included in the 24 colors can be used to express a 24-dimensional color feature vector. The 24-dimensional color feature vector corresponds to the color histogram, and the color histogram can serve as the color features of the at least one target region in the image. A different number of color bins can be used in other embodiments.

2. Feature Extraction Technique for Extracting Shape Features.

In the present application, a shape context (SC) technique can be used as the feature extraction technique for extracting shape features.

By analyzing the images, the image retrieval server 120 can determine that if an image (such as a target region of the image) contains a total of m pixel points, then a certain pixel point $P_i$ has relationships with all of the remaining m−1 pixel points. Subsequently, m−1 vectors can be generated based on the relationships between $P_i$ and the remaining m−1 pixel points. The m−1 vectors can represent information determining the shape features of the target region. Because a contour of an object is one of the most direct descriptions of the object's shape features, a certain number of discrete points along the contour can therefore express the shape features of the object. Therefore, the SC technique includes, after the contour is extracted from the target region of the image, selecting evenly distributed pixel points along the contour for the execution of log-polar coordinate transformation. By performing the log-polar coordinate transformation on the selected pixel points, a corresponding log-polar coordinate histogram can be obtained. In the event that a total of Q pixel points along the contour are selected, the number of dimensions of the log-polar coordinate histogram is Q. Because the log-polar coordinate histogram represents the spatial location relationships between each of the pixel points along the contour, the image retrieval server 120 can determine the shape of the target. Therefore, the log-polar coordinate histogram can serve as the shape features reflecting the shape of the image. Furthermore, the log-polar coordinate histogram of the target region of the image obtained in accordance with the SC technique can serve as the extracted shape features of the target region of the image. Similar to the color features, a shape feature vector can be used to express the log-polar coordinate histogram. Accordingly, the shape feature vector can also serve as the shape features of the target region of the image.

Since the SC technique is already a relatively mature technique, a more detailed discussion of the technique is omitted for conciseness.

3. Feature Extraction Technique for Extracting Texture Features.

In the present application, a local binary patterns (LBP) technique can be used to extract texture features of the at least one target region of the image. The texture features extracted by the LBP technique include: an assembly of N pixel points which are respectively equidistant from a designated pixel point. In other words, the N pixels points can be equidistant from the designated pixel point, and the designated pixel point can correspond to the center point. For example, the distance referred to here can be designated as R. The N pixel points which include points that are equidistant from the designated pixel point are evenly distributed along the circumference of a circle having the designated pixel point as the center of the circle. The circle also has a radius of R, and, for example, 8 adjacent regions that have pixel point $(x_D, y_D)$ as the center point. The grayscale value $I_D$ of center pixel point $(x_D, y_D)$ can serve as the threshold value, and based on the size relationship between the threshold value and grayscale values $I_\phi$ (where $\phi$ is 0, 1, 2, ..., 7, respectively) of eight adjacent pixel points that are at a distance of R from the center pixel point $(x_D, y_D)$, the grayscale values of the eight adjacent pixel points, $I_0, I_1, \ldots, I_7$, are respectively encoded as 1 or 0 to ultimately obtain an eight-digit binary number. Subsequently, the eight-digit binary number is converted into a base ten integer, and the base ten integer is used as a texture primitive code $LBP_{N,R}(x_D, y_D)$ within the 8 adjacent regions that have the pixel point $(x_D, y_D)$ as the center. Thus, the texture primitive code $LBP_{N,R}(x_D, y_D)$ is the texture features for the 8 adjacent regions. In other words, the texture primitive code $LBP_{N,R}(x_D, y_D)$ is the aforesaid assembly of the ordinal measurement features among the grayscale values. The specific formula to compute the texture primitive code $LBP_{N,R}(x_D, y_D)$ corresponds to formula [2] below:

$$LBP_{N,R}(x_D, y_D) = \sum_{\phi=0}^{N-1} \text{sgn}(I_\phi - I_D) 2^\phi \quad [2]$$

Where N is the number of pixel points located in the adjacent areas having pixel point $(x_D, y_D)$ as the center and whose distance from pixel point $(x_D, y_D)$ is equal to the designated distance (for example, using the example of the above situation, the number of pixel points can be 8), sgn corresponds to a redefined sign function, and sgn $(I_\phi-I_D)$ represents an encoding of $I_\phi$ implemented by comparing relationships between the size of grayscale value $I_\phi$ and the size of grayscale value $I_D$. In another example, when $I_\phi-I_D \geq 0$, sgn $(I_\phi-I_D)=1$; and when $I_\phi-I_D<0$, sgn $(I_\phi-I_D)=0$.

In the present application, in order to extract the texture features of the at least one target region of the image more efficiently, the at least one target region of the image can be first divided into L×L sub-regions. Subsequently, the texture features can be extracted from all of the sub-regions in parallel. In one example, the value of L can be 4. The shape of the divided sub-regions can be rectangular. The sub-regions can be non-overlapping or overlapping. As one aspect, generally, one sub-region will not completely overlap another sub-region.

Each of the sub-regions are targeted so that the following can be executed in parallel: for each pixel point included in the each sub-region, the image retrieval server 120 can determine the texture primitive code for the adjacent areas having the pixel point as the center. For example, for one sub-region containing $N_1$ pixel points, a total of $N_1$ texture primitive codes can be determined. The image retrieval server 120 can target the determined $N_1$ texture primitive codes by counting the number of occurrences of the different texture primitive codes included in the determined $N_1$ texture primitive codes, and using a histogram to express the number of occurrences of the different texture primitive codes counted, an LBP feature histogram can be obtained. The LBP feature histogram can correspond to the texture features for the each sub-region. After the LBP feature histogram for the each sub-region is obtained, the texture features for the at least one target region composed of all of the sub-regions can be determined. For example, the texture features of the at least one target region of the image can be determined by combining each of the LBP feature histograms. Similar to the color features, a texture feature vector can be used to express the combined LBP feature histograms. The texture feature vector can also correspond to the texture features of the at least one target region of the image.

4. Feature Extraction Technique for Extracting SIFT Features.

SIFT features are local features which use computer vision techniques to detect and describe images. For the sake of convenience, the feature extraction technique for extracting SIFT features are to be referred to as a SIFT technique. The technique finds an extreme point in a spatial scale, and extracts the extreme point's location, scale, and rotational invariance.

In the present application, in step 310, for each of the at least one target region of the image, the following steps are performed. First, pixel points in the at least one target region having rotational invariance and scale invariance can be determined. These pixels are also referred to as SIFT feature pixels or key pixels. A pixel is deemed to have rotational invariance and scale invariance, when the image is rotated with an arbitrary angle or is transformed by any scale, the corresponding SIFT features of the pixel do not change. Since the determination of rotational invariance and scale invariance is well-known, details of determining rotational invariance and scale invariance are omitted for conciseness. Subsequently, for each key pixel point, 64 pixel points distributed around the each key pixel point in adjacent areas having the key pixel point as the center are selected from among the pixel points included in the at least one target region of the image. In some embodiments, the 64 pixel points can be arranged in an 8×8 structure having the key pixel point as the center of the structure. The selected 64 pixel points are grouped based on a grouping method in which four adjacent pixel points are assigned to the same pixel group. Accordingly, the selected 64 pixel points are divided into a total of 16 pixel groups. For each of the 16 pixel groups, vector addition is performed on the directions of the four pixel points included in each pixel group to obtain a pixel group direction. The pixel group direction is then projected onto the eight directions relative to each key pixel point to obtain eight coordinate values. The eight directions include top, bottom, left, right, upper left, upper right, lower left, and lower right. Ultimately, the 16 pixel groups will correspond to 128 (i.e., 16×8) coordinate values. A 128-dimensional feature vector formed from the 128 coordinate values is the SIFT feature of the each key pixel point. In the present application, the 128-dimensional feature vector formed from the 128 coordinate values determined for each key pixel point included in the at least one target region of the image can serve as the extracted SIFT feature of the at least one target region included in the image.

As another aspect, based on the principles of the SIFT technique described above, one 128-dimensional feature vector targeting one key pixel point in the at least one target region of the image can be determined. Assuming that the at least one target region of the image contains a total of r key pixel points, then the SIFT features determined for the at least one target region of the image can be an r*128-dimensional feature vector. The number of dimensions of the r*128-dimensional feature vector is large, and consumes a large quantity of computing resources in subsequent application. In order to reduce the usage of computing resources, the present application discloses another SIFT technique. This SIFT technique uses a visual word (e.g., a number or a symbol) to express the SIFT features of a key pixel point. The technique can be divided into two parts: the first part is a model training part, and the second part is a SIFT feature determination part. The first part includes the following steps:

First, for a second sample image library having a large number of images, a technique similar to the method described above is used to separately determine the key pixel points included in the at least one target region of each image in the second sample image library to obtain a plurality of key pixel points.

Subsequently, a K-means clustering technique is used to train a key pixel point set including all of the obtained key pixel points to obtain a visual word tree. Details of how to obtain the visual word tree are described below. The visual word tree has l levels and includes K branches. Each node of the visual word tree corresponds to one key pixel point. The values of l and K can be set manually.

The K-means clustering technique is known in the art. The purpose of the K-means clustering technique is to target s data objects. Based on an input quantity p, the s data objects are divided into p clusters, and the p clusters satisfy the condition that "the similarity value of the data objects within the same cluster is relatively high, and the similarity value of data objects in different clusters is relatively low." In other words, the process includes the following steps: select any p data objects from the s data objects to serve, respectively, as initial cluster centers. The initial cluster centers correspond to p clusters. For example, the s data objects correspond to an initial set of data objects, to be grouped into p clusters. Initially, a set of p data objects are selected from the s data objects where each of the p data objects is an initial cluster center for one corresponding cluster of the p clusters. Subsequently, the other data objects which have not been selected (i.e., the remaining data objects) can be separately assigned to the cluster with which they have the most similarity based on the similarity values of each initial cluster center. In this example, the similarity value can be measured using the distance between the data object and the initial cluster center. Distance can refer to the distance (for example, Euclidean distance) between the SIFT features (e.g., the 128-dimensional feature vector) of the data object and the SIFT features of the initial cluster center. After the other data objects (i.e., remaining data objects) have been assigned to the clusters, the cluster center of each cluster is recalculated to correspond with the mean of all data objects included in a cluster. Thereby, the recalculated center of the each cluster corresponds to the new cluster centers. For the determined new cluster centers, the above process is repeated continually until a standard measurement function begins to converge. The mean square error can be used as the standard measurement function.

Based on the K-means clustering technique described above, in order to obtain a visual word tree that has l levels and K branches, clustering can be performed on all key pixel points determined in the at least one target regions of each image in the second sample image library. The K clusters obtained correspond with the first level. Then, for each cluster of the obtained K clusters, all of the key pixel points included in the each cluster are clustered using the K-means clustering technique to obtain K sub-clusters under the each cluster. The K*K sub-clusters obtained by separately clustering the K clusters in the first level are the second level. By repeating the above steps for a total of l iterations, a visual word tree having l levels and K branches can be obtained. The visual word tree with level l has a total of $K^l$ clusters. Each cluster located on level l of the visual word tree can be referred to as a leaf node. In the present application, a different number can be assigned to each leaf node as long as the number assigned to each leaf node is unique. For example, the rule for assigning numbers to leaf nodes can be as follows: from left to right, starting from zero, each leaf node is numbered separately in sequence, with a number ranging from 0 to $K^l-1$.

The above steps form the "model training part." The steps below describe the "SIFT feature determination part."

First, for the at least one target region of the image determined by executing step 310, the image retrieval server 120 determines the key pixel points in the at least one target region.

Subsequently, for each determined key pixel point in the at least one target region, the image retrieval server 120 performs the following steps: determining the 128-dimensional feature vector corresponding to the each key pixel point based on the SIFT feature determination part. Providing the K clusters of level 1 of the visual word tree and comparing the distance between the current key pixel point and the cluster center of the current cluster (i.e., compare the distance between the 128-dimensional feature vector corresponding to the current key pixel point and the 128-dimensional feature vector corresponding to the cluster center of the current cluster), the cluster having the smallest distance to the current key pixel point among the K clusters of level 1 can be found. Subsequently, finding the cluster having the smallest distance to the current key pixel point among the K clusters located on a next level (i.e., level 2) under the current cluster can be found. The finding the visual word tree branch having the smallest distance to the current key pixel point is continued by traversing downward until the process has traversed to a particular leaf node. The process is continued until the distance between the cluster center of the cluster corresponding to this leaf node and the current key pixel point is minimized, and the cluster center of the cluster corresponding to this leaf node is referred to as the first key pixel point. The number of the leaf node to which the process has traversed, i.e., the number of the first key pixel point, is determined to be the number of the current key pixel point. The number of the current key pixel point serves as the visual word for the current key pixel point, and the visual word is the SIFT feature of the current key pixel point.

The above method is used for each key pixel point determined in the at least one target region of the image. The first key pixel point having the smallest distance to the each key pixel point in the visual word tree is determined. The number of the first key pixel point is determined, and the vector composed of the number of first key pixel points determined for the each key pixel point serves as the extracted SIFT features of the at least one target region included in the image.

Based on the above steps, the present application expresses the SIFT features of a key pixel point using a number, and uses the vector composed of the SIFT features of each key pixel point as the SIFT features of the at least one target region of the image. The number can correspond with the number of the leaf node, which is also the visual word. Assume that a total of r key pixel points are extracted from the at least one target region of the image. Then, using the above SIFT feature determination part, the SIFT features ultimately determined for the at least one target region of the image is an r-dimensional vector. Each element of the r-dimensional vector relates to the visual word corresponding to one key pixel point. In comparison to a method directly using an r*128- dimensional feature vector composed of the 128-dimensional feature vectors corresponding to each key pixel point as the SIFT features of target regions, the method of extracting SIFT features offered in the present application significantly reduces the number of dimensions that the feature vector uses to express the SIFT features. Thus, a reduction in the consumption of computing resources can occur.

At this point, the visual features of the at least one target region of the image have been extracted. The extracted visual features include color features, shape features, texture features, and SIFT features. The methods described above may be used to extract only one or more than one of the four types of features to serve as the extracted visual features.

In step 330, based on the extracted visual features, the image retrieval server 120 performs a clustering operation on the images included in the image library, and assigns category identifiers to the clustered images.

In the present application, parameters referenced while performing the clustering operation may include descriptive information of the images and the extracted visual features, or the parameters may include only the extracted visual features. The clustering operation can refer to a technique combining hierarchical clustering and K-means.

Figure 3B:
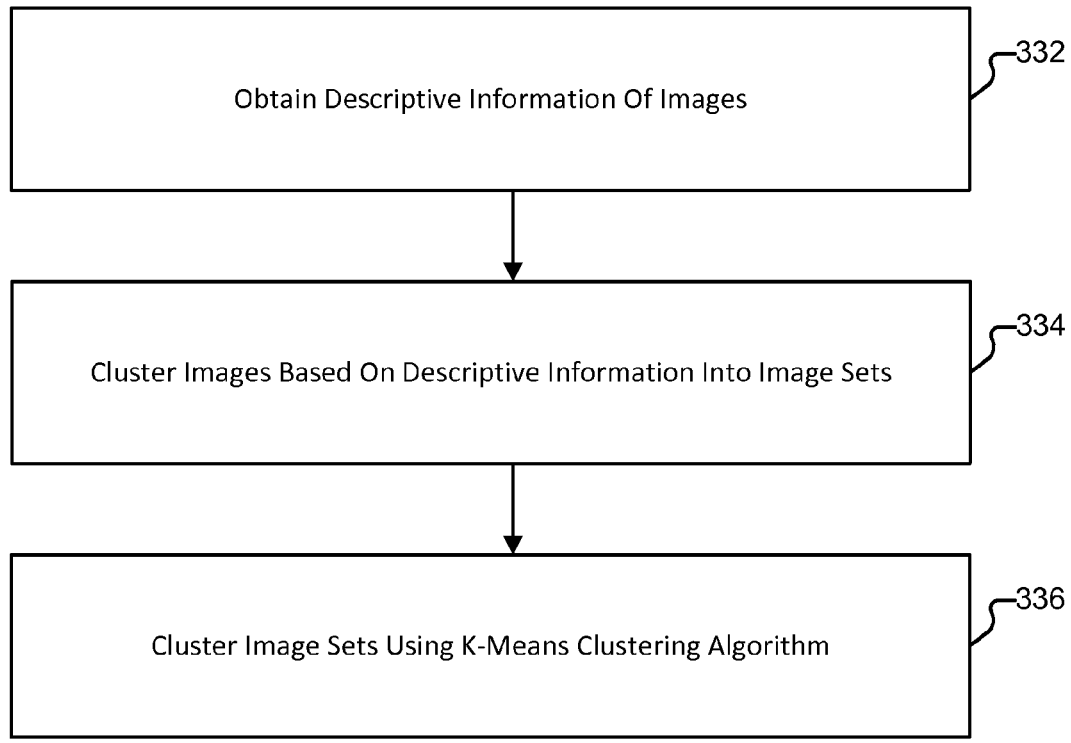
FIG. 3B is a flowchart illustrating an embodiment of a method of a clustering operation.
Figure 3C:
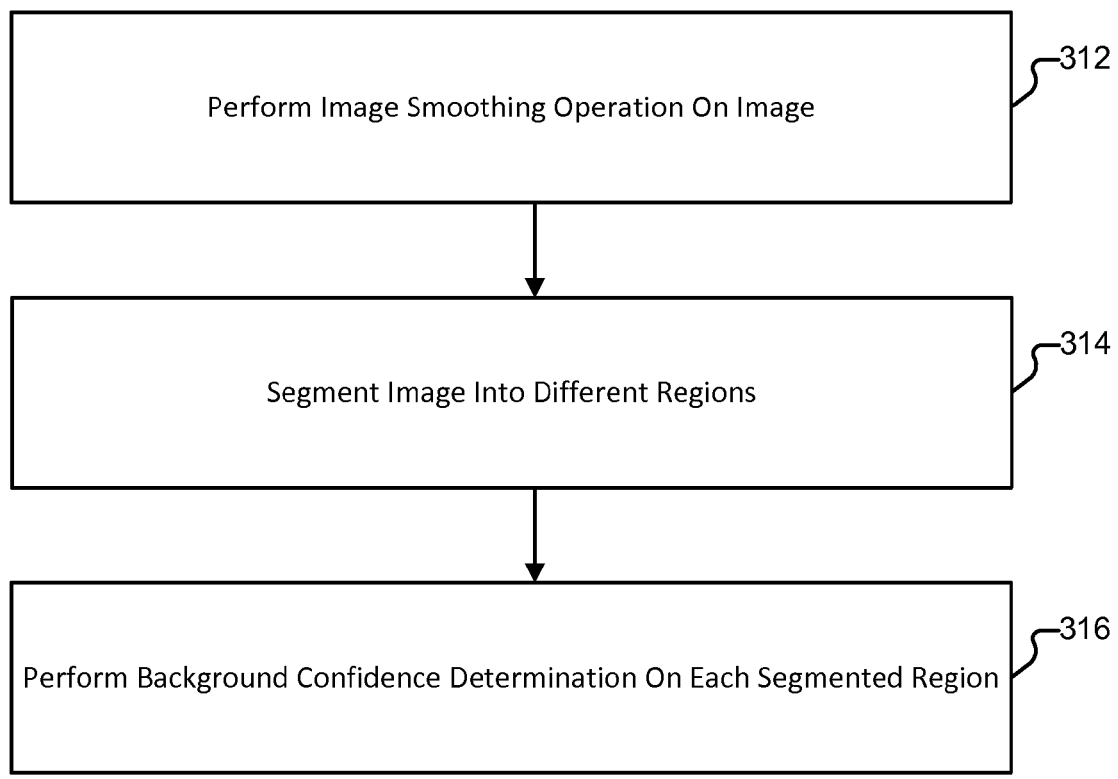
FIG. 3C is a flowchart illustrating an embodiment of a method of determining at least one target region in images.

FIG. 3B is a flowchart illustrating an embodiment of a method of a clustering operation. The clustering operation referencing different parameters is described below.

In the one situation, the referenced parameters can include both the descriptive information of the images and the extracted visual features. In this situation, the clustering of the images included in the image library may include the following steps:

In step 332, the image retrieval server 120 obtains descriptive information of the different images included in the image library, and separately determines text annotation information corresponding to the different images based on the descriptive information. The descriptive information of the images may include text-based information describing the category to which the image belongs to, image header information, descriptive information relating to the content of the image, etc.

In other words, for different images included in the image library, based on the descriptive information of the different images, keywords of the determined descriptive information used to describe the primary content of the different images can serve as the text annotation information for the different images. The keywords to the descriptive information can correspond to the text annotation information of an image. The size of the text annotation information for each image can be fixed.

In step 334, the image retrieval server 120, based on the text annotation information determined for the different images, clusters the images using hierarchical clustering, and can assign the clustered images to a plurality of image sets.

Hierarchical clustering is a relatively mature distance-based clustering technology that has the following implications: Hierarchical clustering determines the correlations between the text annotation information of the different images, and assigns images having high correlations with respect to the text annotation information into the same image categories. In other words, by calculating the text annotation information of images, the text annotation information of images having a high correlation can be grouped into the same class. In this example, the correlation refers to text relevance, which can be calculated by a common text correlation calculation method such as cosine similarity.

In another example, in accordance with the hierarchical clustering method, correlation values can be determined. The correlation values can be used to measure the degree of correlation between the text annotation information of the different images. Images having correlation values greater than a predetermined correlation threshold can be assigned into the same image categories. Accordingly, the images having a high correlation with respect to text annotation information can be assigned to one image category forming an image set. Thus, the image set can be formed having a greater degree of cohesion at a semantic level.

In step 336, for the image set obtained from the hierarchical clustering, based on the visual features extracted from the images, the image retrieval server 120 further performs visual feature-based image clustering using the K-means clustering technique. The extracted visual features include the color features, shape features, texture features, and SIFT features.

Regarding the image set obtained in step 334, generally, the number of images included in the image set can be very large. Also, from the perspective of visual content, the images of the image set can vary wildly. In related art, descriptive text information corresponding to the images can be influenced by the subjective feelings of operators. Accordingly, image sets obtained in step 334 can also be influenced by the subjective feelings of operators. In order to minimize the influence of subjective feelings in step 336, the present application considers further clustering of the obtained image set based on the visual features extracted from the images.

In one example, the clustering operation includes: For the image set obtained by hierarchical clustering, and for an image included in the image set, a visual feature vector used to express the visual features can be extracted from the image. For example, when the extracted visual features include color features, shape features, texture features, and SIFT features, because a color feature vector can be used to express the extracted color features, a shape feature vector can be used to express the extracted shape features, a texture feature vector can be used to express the extracted texture features, and a vector composed of the visual words of each key pixel point in the at least one target region of the image can be used to express the extracted SIFT features. The vector formed by arranging the four vectors according to a fixed sequence can serve as the visual feature vector for the image. The visual words correspond to the numbers of each first key pixel point having the smallest distance from each key pixel point. The four vectors include the color feature vector, the shape feature vector, the texture feature vector, and the vector composed of the visual words of each key pixel point in the at least one target region of the image. The visual feature vector expresses the visual content of the image. Based on the determined visual feature vectors corresponding to the different images, the similarity values among the visual feature vectors of the different images can be determined. The similarity values of the visual feature vectors correspond to the similarity values of the different images. A clustering operation is performed on the images included in the image set in accordance with the K-means clustering technique. The clustering operation can determine the image categories to which the images belong. The similarity values of the visual feature vectors of the different images can be determined based on the distances between the visual feature vectors of the different images. Accordingly, the images in the image library can be clustered. When determining the distances between the visual feature vectors of the different images, because the number of dimensions of the visual feature vector that represents the SIFT features was already reduced when the SIFT features were extracted, the usage of computing resources are further reduced when determining the distances between the visual feature vectors.

Lastly, category identifiers are assigned to the images included in the image set, in accordance with an identifier assignment method. The identifier assignment method assigns the same category identifiers to images belonging to the same image category, and different category identifiers are assigned to images belonging to different image categories. The images and their corresponding category identifiers are saved.

The above image clustering process uses the descriptive information of the images and the extracted visual features as the referenced parameters. Using the above steps 332 through 336, the image retrieval server 120, based on the text descriptive information of the images, further clusters the images included in the image set obtained in the first clustering based on the visual features extracted from the images. Because the parameters referenced during the second clustering are visual features, which are obtained relatively objective, the effect on the image set obtained in the first clustering caused by an operator's subjective feelings relating to text descriptive information is reduced. Thus, the various image categories are ultimately obtained more objectively.

In a second situation, the parameters referenced during the clustering of the images included in the image library include only the extracted visual features. In another example, the clustering of the images included in the image library in the second situation is similar to step 336 under the first situation. Based on the visual features separately extracted from the different images included in the image library, the K-means technique is used to perform a visual feature-based image clustering operation. The visual features include color features, shape features, texture features, and SIFT features.

The clustering process includes the following steps:

For an image in the image library, a visual feature vector expresses the visual features extracted from the image. The visual feature vector can uniquely express the visual content of the image. The method of determining the visual feature vector is essentially the same as the method of determining the visual feature vector in step 336 relating to the above first situation.

Then, in accordance with the K-means clustering technique, based on the similarity values of the visual feature vectors for the different images, a clustering operation is performed on the images included in the image library, and the image categories to which the images belong to are determined. The present application is not limited to the use of the K-means clustering technique, and other clustering techniques may be used instead. An example of another clustering technique includes CURE.

Lastly, category identifiers are respectively assigned to the images in accordance with an identifier assignment method. The identifier assignment method assigns the same category identifiers to images belonging to the same image category, different category identifiers are assigned to images belonging to different image categories, and the images and category identifiers are correspondingly saved.

In the present application, the category identifiers assigned to each image form an image index.

At this point, the clustering operation has been completed for each image in the image library for which an image index is to be generated. The category identifiers that serve as the image index have already been assigned to all of the images. The category identifiers can specifically be class IDs.

In the present application, the above steps 310-330 relate to the offline processing process. One of the objectives of the offline processing process is to generate an image index for an image library in order to provide data support for a subsequent online search process. The online search process relates to steps 340-360. In light of the drawings, the implementation of steps 340-360 included in the online search process is described below.

In step 340, in the actual online search process, based on the category identifiers of the image to be searched, the image retrieval server 120 determines all of the images in the image library corresponding to the category identifiers which match category identifiers of the image to be searched.

In the present application, an example for image searching is as follows: A user enters keywords or terms for performing a keyword-based search. For example, "one-piece dress" is entered. Each retrieved result will have a corresponding image, and corresponding images are in the image library for which an image index has already been generated. By clicking a relevant button, the user can select the image corresponding to a particular retrieval result as the image to be retrieved. In other words, a second search is performed based on the images corresponding to the search results obtained using keywords. The second search is an image-based information retrieval.

In step 350, for each image determined to possess the same category identifier as the image to be searched, the image retrieval server 120 separately determines similarity values for each image. The similarity values measure the degree of similarity between the visual features of each image and the visual features of the image to be searched.

In step 360, the image retrieval server 120 uses the similarity values to select images corresponding to the image to be searched from among the images having the same category identifiers. The images having similarity values greater than a predetermined similarity threshold value can be returned to the client terminal 110 of the user as the search results.

Optionally, regarding the selected images described above, sorting information used to sequence the arrangement of the images can be determined according to the similarity values. The images can be sorted from largest similarity value to smallest similarity value. When the selected images are returned to the user's client terminal as the search results, the sorting information can also be returned to the user's client terminal to instruct the user's client terminal to sort and display the images based on the sorting information. When determining similarity values between individual images having the same category identifier and visual features of the image to be searched, the determining may also be based on the distances between the visual feature vectors of each image and the visual feature vectors of the image to be searched. Also, because the number of dimensions of the vectors in the visual feature vectors representing the SIFT features have already been reduced during the extracting SIFT features process in the offline processing process, the consumption of computing resources to determine the distances between visual feature vectors at this time can be significantly reduced.

Note that if the visual features were extracted from the image as an indivisible whole, the extraction process would prevent the extracted visual features from capturing the spatial differences of the different content included in the image. The extraction process would only be able to reflect certain characteristics of the image as a whole. Thus, it would be difficult to compare the similarity among different images from the perspective of the different content levels of the images. In some embodiments, when searches are performed, the overall similarities of different images carry little weight. Instead, greater weight is given for the similarity of image regions that only include the foreground, i.e., the target region of images. Therefore, extracting only the visual features of the target region of images better satisfies the actual demand.

Also, because the visual features of the background region of the images are no longer extracted, computing resources that would otherwise be used to extract visual features from the background region can be conserved.

In the present application, because the visual features objectively possessed by the images are referenced during the generation of the image index, the accuracy of the generated image index is therefore increased.

Figure 4:
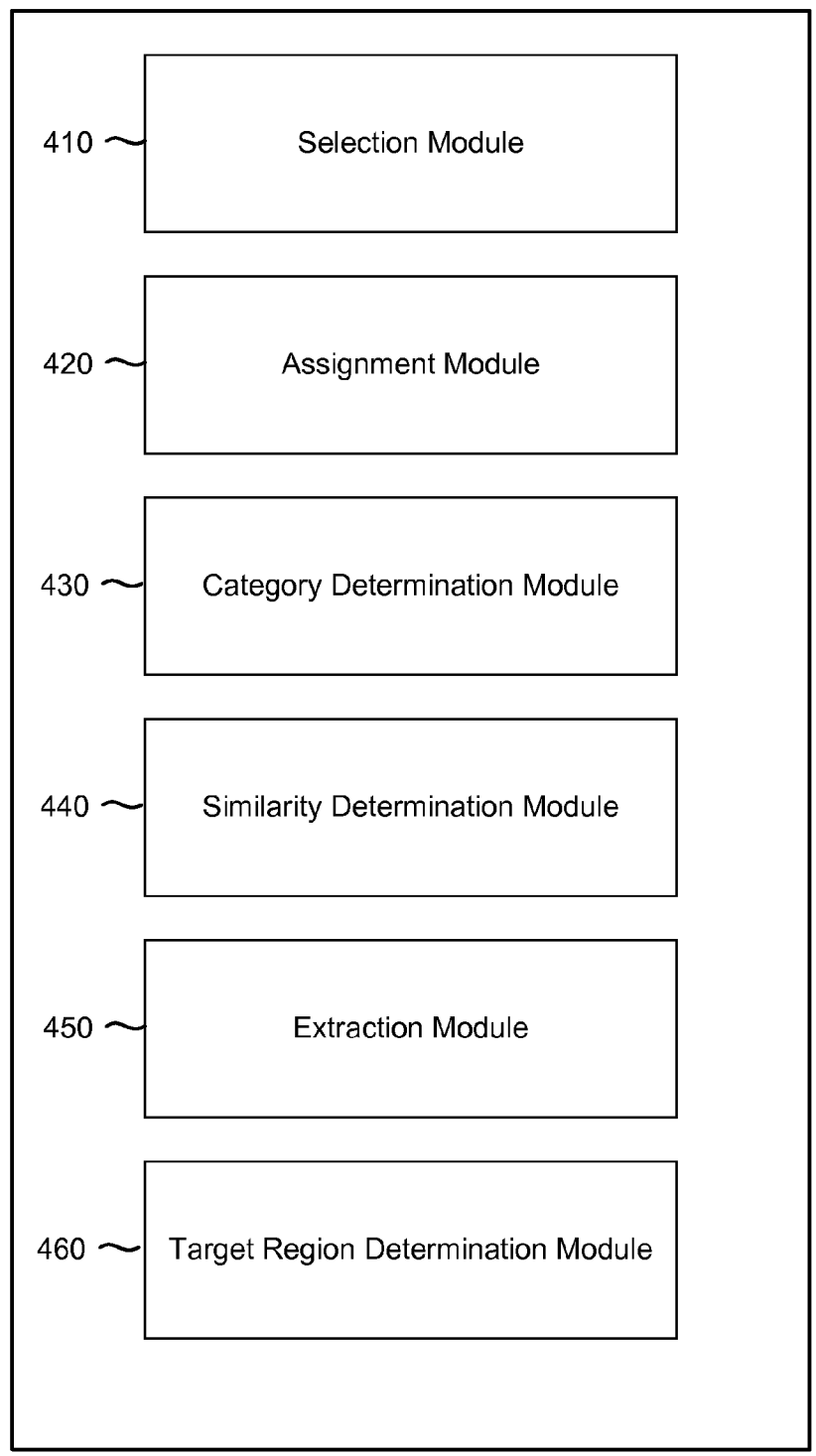
FIG. 4 is a schematic diagram of an embodiment of an image index generation device.

Corresponding to the image index generation method in the present application, image index generation equipment is also disclosed. FIG. 4 is a schematic diagram of an embodiment of an image index generation device. The image index generation device 400 includes a selection module 410, an assignment module 420, a category determination module 430, a similarity determination module 440, an extraction module 450, and a target region determination module 460.

The selection module 410 is configured to select an image from an image library for which an index is to be generated.

The assignment module 420 is configured to respectively assign category identifiers to the images included in the image library in accordance with an identifier assignment method. The identifier assignment method assigns the same category identifiers to images belonging to the same image category, and different category identifiers to images belonging to different image categories.

The category determination module 430 is configured to, based on the determined similarity values of the images, determine image categories to which the images included in the image library belong.

The similarity determination module 440 is configured to determine the similarity values of the images included in the image library based on the visual features extracted from the different images.

The extraction module 450 is configured to, for each image included in an image library for which an image index is to be generated, determine the at least one target region of the images, and extract the visual features from the determined at least one target region.

The extraction module 450 is further configured to perform the following steps. The visual features extracted from the determined at least one target region include at least one of the following: color features, shape features, texture features, and scale-invariant feature transform (SIFT) features. In the event that the extracted visual features are SIFT features, for the determined at least one target region in the image, the SIFT technique determines each of the key pixel points in the at least one target region of the image, and 128-dimensional feature vectors corresponding to each of the key pixel points are determined. For the 128-dimensional feature vectors corresponding to the each of the key pixel points, the distances between the 128-dimensional feature vectors corresponding to the key pixel point and the 128-dimensional vectors corresponding to each of the key pixel points in a predetermined sample image library are compared. A first key pixel point in the sample image library having the smallest distance from the 128-dimensional feature vector corresponding to the first key pixel point is determined, and the number assigned in advance to the first key pixel point is determined. A vector formed from the numbers of the first key pixel points determined for the each key pixel point is used as the SIFT features extracted from the at least one target region of the image.

The similarity determination module 440 is further configured to separately determine text annotation information corresponding to different images based on descriptive information of the different images included in the image library, determine correlation values used to measure the degree of correlation between the text annotation information corresponding to the different images, allocate the images included in the image library to a plurality of image sets using a hierarchical clustering method based on the determined correlation values for one image set, determine visual feature vectors corresponding to the different images based on visual features retrieved from the different images included in the image set, and determine similarity values among the different images based on the determined visual feature vectors corresponding to the different images.

The similarity determination module 440 is also configured to determine the visual feature vectors corresponding to the different images based on the visual features extracted from the different images included in the image library, and determine the similarity values among the different images based on the determined visual feature vectors corresponding to the different images.

The extraction module 450 is configured to execute an image smoothing operation on the image, and for the image on which the image smoothing operation has been performed, use each pixel point in the image as a seed to perform a region growing operation to segment the image into a plurality of regions.

The target region determination module 460 is configured to determine at least one target region from among the segmented plurality of regions of the image.

The category determination module 430 is configured to perform a clustering operation on the images included in the image library in accordance with the K-means clustering technique based on the determined similarity values among the images, and to determine the image categories to which the images included in the image library belong.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The present application discloses an image index generation method and device. In the method, visual features are separately extracted from the at least one target region in the images included in the image library. The similarity values among the images included in the image library are determined based on the extracted visual features. The image categories to which the images belong are determined. The same category identifiers are assigned to images belonging to the same image category, and different category identifiers are assigned to images belonging to different image categories. The category identifiers assigned to the images are used to generate an image index for the image library. As compared to the prior art, the method can be implemented automatically without requiring manual addition of the image index to increase the efficiency of the generation of the image index generation. Also, because the image index is generated based on the extraction of visual features from the images, the determination of the similarity among the images, and the subsequent determination of the image categories to which the images belong, the influence of the operator's subjective feeling brought about when an image index is generated manually is reduced, and accordingly, the accuracy of the generated image index is improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for managing images, comprising:
    selecting, from a storage device, an image included in an image library for which an image index is to be generated;
    determining at least one target region included in the image, wherein at least a part of a foreground of the image is included in the at least one target region, and a background of the image is not included in the at least one target region;
    extracting a set of one or more visual features from the determined at least one target region, the set of one or more visual features extracted from the determined at least one target region including a scale-invariant feature transform (SIFT) feature, wherein the extracting of the set of one or more visual features includes:
        for the determined at least one target region in the image:
            performing a SIFT to determine each of key pixel points in the at least one target region; and
            separately determining an N-dimensional feature vector corresponding to the each of the key pixel points, N being an integer; and
        for the N-dimensional feature vector corresponding to the each of the key pixel points:
            comparing a distance between the N-dimensional feature vector corresponding to a key pixel point and the N-dimensional feature vectors corresponding to the each of the key pixel points in a predetermined sample image library;
            determining a first key pixel point in the image library, the first key pixel point having a smallest distance from the N-dimensional feature vector corresponding to the each of the key pixel points;
            determining a number assigned to the first key pixel point; and
            forming a vector comprising the numbers corresponding to the first key pixel points determined for the each of the key pixel points, wherein the vector serves as the SIFT features extracted from the target region;
    determining, using one or more computer processors, a similarity value of the selected image and another image included in the image library based on the extracted set of one or more visual features;
    determining image categories to which the images included in the image library belong, based at least in part on the determined similarity value of the selected image and the other image; and
    assigning category identifiers to the images included in the image library, wherein a same category identifier is assigned to images belonging to a same image category, and different category identifiers are assigned to images belonging to different image categories.

2. The method as described in claim 1, wherein:
    the set of one or more visual features extracted from the determined at least one target region further includes a color feature, a shape feature, a texture feature, or any combination thereof.

3. The method as described in claim 1, wherein the determining of the similarity value of the selected image and the other image included in the image library based on the set of one or more visual features comprises:
    determining text annotation information corresponding to different images based on descriptive information of the different images included in the image library;
    determining correlation values used to measure degree of correlation between the text annotation information of the different images;
    based on the determined correlation values, allocating the images included in the image library to a plurality of image sets using a hierarchical clustering method; and
    for one of the image sets:
        determining visual feature vectors corresponding to the different images based on the set of one or more visual features; and
        determining similarity values among the different images based on the determined visual feature vectors corresponding to the different images.

4. The method as described in claim 1, wherein the determining of the similarity value of the selected image and the other image comprises:
    determining visual feature vectors corresponding to different images based on the set of one or more visual features; and
    determining the similarity values among the different images based on the determined visual feature vectors corresponding to the different images.

5. The method as described in claim 1, wherein the determining of the at least one target region in the image comprises:
    performing an image smoothing operation on the image; and
    using each pixel point in the image on which the image smoothing operation has been performed as a seed to perform a region growing operation to segment the image into a plurality of regions, wherein the at least one target region is determined among the plurality of regions.

6. The method as described in claim 1, wherein the determining of the image categories to which the images included in the image library belong comprises:
    performing a clustering operation on the images included in the image library based on the similarity value of the selected image and the other image, in accordance with a clustering technique, to determine the image categories to which the images included in the image library belong.

7. The method as described in claim 1, wherein N is 128.

8. An image generation device, comprising:
    at least one processor configured to:
        select an image included in an image library for which an image index is to be generated;
        determine at least one target region included in the image, wherein at least a part of a foreground of the image is included in the at least one target region, and a background of the image is not included in the at least one target region;
        extract a set of one or more visual features from the determined at least one target region, the set of one or more visual features extracted from the determined at least one target region including a scale-invariant feature transform (SIFT) feature, wherein the extracting of the set of one or more visual features includes:
            for the determined at least one target region in the image:
                performing a SIFT to determine each of key pixel points in the at least one target region; and separately determining an N-dimensional feature vector corresponding to the each of the key pixel points, N being an integer; and for the N-dimensional feature vector corresponding to the each of the key pixel points:
comparing a distance between the N-dimensional feature vector corresponding to a key pixel point and the N-dimensional feature vectors corresponding to the each of the key pixel points in a predetermined sample image library;
determining a first key pixel point in the image library, the first key pixel point having a smallest distance from the N-dimensional feature vector corresponding to the key pixel point;
determining a number assigned to the first key pixel point; and
forming a vector comprising the numbers corresponding to the first key pixel points determined for the each of the key pixel points, wherein the vector serves as the SIFT features extracted from the target region;

determine a similarity value of the selected image and another image included in the image library based on the extracted set of one or more visual features;
determine image categories to which the images included in the image library belong based on the determined similarity value of the selected image and the other image; and
assign category identifiers to the images included in the image library, wherein a same category identifier is assigned to images belonging to a same image category, and different category identifiers are assigned to images belonging to different image categories; and a memory coupled to the at least one processor and configured to provide the at least one processor with instructions.

9. The device as described in claim 8, wherein:
the set of one or more visual features extracted from the determined at least one target region further includes a color feature, a shape feature, a texture feature, or any combination thereof.

10. The device as described in claim 8, wherein to determine the similarity value of the selected image and the other image included in the image library based on the extracted set of one or more visual features comprises:
determine text annotation information corresponding to different images based on descriptive information of the different images included in the image library;
determine correlation values used to measure degree of correlation between the text annotation information of the different images;
based on the determined correlation values, allocate the images included in the image library to a plurality of image sets using a hierarchical clustering method; and
for one of the image sets:
determine visual feature vectors corresponding to the different images based on the set of one or more visual features; and
determine similarity values among the different images based on the determined visual feature vectors corresponding to the different images.

11. The device as described in claim 8, wherein to determine the similarity value of the selected image and the other image comprises:
determine visual feature vectors corresponding to different images based on the set of one or more of visual features; and
determine the similarity values among the different images based on the determined visual feature vectors corresponding to the different images.

12. The device as described in claim 8, wherein to determine the at least one target region in the image comprises:
perform an image smoothing operation on the image; and
use each pixel point in the image on which the image smoothing operation has been performed as a seed to perform a region growing operation to segment the image into a plurality of regions, wherein the at least one target region is determined among the plurality of regions.

13. The device as described in claim 8, wherein to determine the image categories to which the images included in the image library belong comprises:
perform a clustering operation on the images included in the image library based on the similarity value of the selected image and the other image, in accordance with a clustering technique, to determine the image categories to which the images included in the image library belong.

14. A computer program product for generating an image index, the computer program product being embodied in a non-transitory computer readable storage medium and comprising computer instructions for:
selecting an image included in an image library for which the image index is to be generated;
determining at least one target region included in the image, wherein at least a part of a foreground of the image is included in the at least one target region, and a background of the image is not included in the at least one target region;
extracting a set of one or more visual features from the determined at least one target region, the set of one or more visual features extracted from the determined at least one target region including a scale-invariant feature transform (SIFT) feature, wherein the extracting of the set of one or more visual features includes:
for the determined at least one target region in the image:
performing a SIFT to determine each of key pixel points in the at least one target region; and
separately determining an N-dimensional feature vector corresponding to the each of the key pixel points, N being an integer; and
for the N-dimensional feature vector corresponding to the each of the key pixel points:
comparing a distance between the N-dimensional feature vector corresponding to a key pixel point and the N-dimensional feature vectors corresponding to the each of the key pixel points in a predetermined sample image library;
determining a first key pixel point in the image library, the first key pixel point having a smallest distance from the N-dimensional feature vector corresponding to the key pixel point;
determining a number assigned to the first key pixel point; and
forming a vector comprising the numbers corresponding to the first key pixel points determined for the each key pixel point, wherein the vector serves as the SIFT features extracted from the target region;
determining a similarity value of the selected image and another image included in the image library based on the extracted set of one or more visual features;

determining image categories to which the images included in the image library belong, based at least in part on the determined similarity value of the selected image and the other image; and assigning category identifiers to the images included in the image library, wherein a same category identifier is assigned to images belonging to a same image category, and different category identifiers are assigned to images belonging to different image categories.

15. The computer program product as described in claim 14, wherein:
the set of one or more visual features extracted from the determined at least one target region further includes a color feature, a shape feature, a texture feature, or any combination thereof.

16. The computer program product as described in claim 14, wherein the determining of the similarity value of the selected image and the other image included in the image library based on the extracted visual features comprises:
separately determining text annotation information corresponding to different images based on descriptive information of the different images included in the image library;
determining correlation values used to measure a degree of correlation between the text annotation information of the different images;
based on the determined correlation values, allocating the images included in the image library to a plurality of image sets using a hierarchical clustering method; and
for one of the image sets:
determining visual feature vectors corresponding to the different images based on the set of one or more visual features; and
determining similarity values among the different images based on the determined visual feature vectors corresponding to the different images.

17. The computer program product as described in claim 14, wherein the determining of the similarity value of the selected image and the other image comprises:
determining visual feature vectors corresponding to different images based on the set of one or more visual features; and
determining the similarity values among the different images based on the determined visual feature vectors corresponding to the different images.

18. The computer program product as described in claim 14, wherein the determining of the at least one target region in the image comprises:
performing an image smoothing operation on the image;
using each pixel point in the image on which the image smoothing operation has been performed as a seed to perform a region growing operation to segment the image into a plurality of regions, wherein the at least one target region is determined among the plurality of regions.

19. The computer program product as described in claim 14, wherein the determining of the image categories to which the images included in the image library belong comprises:
performing a clustering operation on the images included in the image library based on the similarity value of the selected image and the other image, in accordance with a clustering technique, to determine the image categories to which the images included in the image library belong.

20. The computer program product as described in claim 14, wherein N is 128.

21. A method for managing images, comprising:
determining at least one target region included in an image included in an image library to be searched, wherein at least a part of a foreground of the image is included in the at least one target region, and a background of the image is not included in the at least one target region;
extracting a set of one or more visual features from the determined at least one target region;
performing, based at least in part on the set of one or more visual features, a clustering operation on images included in the image library, wherein the performing of the clustering operation on the images comprises:
obtaining descriptive information respectively associated with the images;
obtaining an image set by clustering the images based at least in part on descriptive information respectively associated with the images; and
clustering at least images included in the image set based at least in part on at least one of the set of one or more visual features respectively extracted from the images included in the image set;
assigning category identifiers to the clustered images, wherein a same category identifier is assigned to a cluster of images belonging to a same image category, and different category identifiers are assigned to a cluster of images belonging to different image categories;
determining, using one or more processors, at least one image in the image library corresponding to a category identifier which matches a category identifier of the image to be searched;
determining, using the one or more processors, a similarity value for the determined at least one image and the image to be searched; and
selecting, using the one or more processors, an image from the at least one image based on the similarity value.

22. A computer program product for generating an image index, the computer program product being embodied in a non-transitory computer readable storage medium and comprising computer instructions for:
determining at least one target region included in an image included in an image library to be searched, wherein at least a part of a foreground of the image is included in the at least one target region, and a background of the image is not included in the at least one target region;
extracting a set of one or more visual features from the determined at least one target region, the set of one or more visual features extracted from the determined at least one target region including a scale-invariant feature transform (SIFT) feature, wherein the extracting of the set of one or more visual features includes:
for the determined at least one target region in the image:
performing a SIFT to determine each of key pixel points in the at least one target region; and
separately determining an N-dimensional feature vector corresponding to the each of the key pixel points, N being an integer; and
for the N-dimensional feature vector corresponding to the each of the key pixel points:
comparing a distance between the N-dimensional feature vector corresponding to a key pixel point and the N-dimensional feature vectors corresponding to the each of the key pixel points in a predetermined sample image library;
determining a first key pixel point in the image library, the first key pixel point having a smallest distance from the N-dimensional feature vector corresponding to the key pixel point;

determining a number assigned to the first key pixel point; and forming a vector comprising the numbers corresponding to the first key pixel points determined for the each key pixel point, wherein the vector serves as the SIFT features extracted from the target region;

performing, based at least in part on the set of one or more visual features, a clustering operation on images included in the image library;

assigning category identifiers to the clustered images, wherein a same category identifier is assigned to a cluster of images belonging to a same image category, and different category identifiers are assigned to a cluster of images belonging to different image categories;

determining at least one image in the image library corresponding to a category identifier which matches a category identifier of the image to be searched;

determining a similarity value for the determined at least one image and the image to be searched; and selecting an image from the at least one image based on the similarity value.

\* \* \* \* \*